(12) United States Patent
McIlraith

(10) Patent No.: US 6,487,932 B2
(45) Date of Patent: Dec. 3, 2002

(54) ELASTIC BICYCLE CRANK APPARATUS

(76) Inventor: Terry E. McIlraith, 407 Castello Rd., Lafayette, CA (US) 94549

( * ) Notice: Subject to any disclaimer, the term of this patent is extended or adjusted under 35 U.S.C. 154(b) by 24 days.

(21) Appl. No.: 09/774,655

(22) Filed: Feb. 1, 2001

(65) Prior Publication Data

US 2001/0032525 A1 Oct. 25, 2001

Related U.S. Application Data

(60) Provisional application No. 60/194,904, filed on Apr. 6, 2000.

(51) Int. Cl.[7] .................................................. G05G 1/14
(52) U.S. Cl. ...................................... 74/594.1; 280/259
(58) Field of Search .............................. 74/594.1, 594.2, 74/594.3; 280/259, 260, 261; 267/154; 474/160; 464/77, 61, 56

(56) References Cited

U.S. PATENT DOCUMENTS

| 4,753,127 A | * | 6/1988 | Baumann | .................... 74/594.1 |
| 5,257,540 A | * | 11/1993 | Bower et al. | ............... 482/900 |

\* cited by examiner

*Primary Examiner*—Charles A Marmor
*Assistant Examiner*—Dennis Abdelnour
(74) *Attorney, Agent, or Firm*—C. Kingsford-Smith

(57) ABSTRACT

A bicycle crank assembly comprises pedals, crank arms, an axle and a chainring assembly. The pedals, crank arms, and axle are coupled to the chainring assembly through an elastic element in the form of a U-shaped spring. This elastic coupling allows relative angular rotation between pedals and chainring proportional to the force exerted on the pedals by a bicycle rider. The proportionality constant, or elasticity, is adjustable by repositioning the spring within its supporting structure. The elasticity may be thus adjusted to enable accurate calibration of measurement instrumentation associated with the crank assembly, or for any purpose for which an adjustable elastic coupling is desirable.

6 Claims, 4 Drawing Sheets

ELASTIC BICYCLE CRANK APPARATUS

A co-pending provisional application, number 60/194,904, was filed on Apr. 6, 2000.

BACKGROUND OF THE INVENTION a) Field of the Invention

This invention relates to bicycle cranks for pedal driven bicycles and specifically to a means to allow the bicycle crank a predetermined amount of elasticity that can be controlled and measured as a rider of the bicycle imparts force to the crank pedals.

b) Description of the Related Art

U.S. Pat. No. 5,257,540 (Bower et al, issued Nov. 2, 1993; the present inventor is a co-inventor in this patent) teaches an ingenious bicycle crank, whereby the crank relies on the introduction of an elastic support structure between a) the axle, on the ends of which the pedal assemblies are mounted and b) the chain ring assembly. (The chain ring assembly refers to one or more annular disks of different sizes forming a rigid assembly, each disc having circumferential teeth). When pedal force is applied, the elastic member allows an angular deflection between the chain ring assembly and the axle. The elastic support structure is composed of an annular disc having radial slots therein or a solid anisotropic material, oriented such that the elasticity is greater in the circumferential direction. The elasticity is not adjustable in the prior art.

BRIEF SUMMARY OF THE INVENTION

The elastic bicycle crank provides at least three structures that together form a functional unit. The first structure incorporates an axle having two pedal cranks attached to either end of the axle. The second structure is a chainring assembly comprising one or more annular discs that form a rigid assembly having a rigid set of teeth. Each disc has teeth on its periphery for engaging a drive chain. The above two structures are well known in the art. The third structure elastically connects the chainring assembly to the axle to allow for deflection therebetween. The previous patent, referenced herein, describes this elastic member as being formed from a disk having radial slots to provide some elasticity. Although this construction is quite effective in providing, in that patent, the best mode of operation with a workable and ingenious solution to the invention, the new elastic member structure provides adjustable deflections by connecting the chainring assembly structure and the axle structure with an adjustable U-shaped spring assembly. This U-shaped spring assembly allows for constant, but readily adjustable, elasticity. Having an adjustable elastic structure allows different bicycle riders an increased benefit of adjustable sensitivity. Each bicycle rider may set the amount of elasticity and the sensitivity to his or her needs. In particular, each rider may set the degree of elasticity to the proper amount to allow accurate calibration of associated measurement instrumentation which may indicate the rider's pedal force and other important data.

OBJECTS OF THE INVENTS

A primary object of this invention is to provide an elastic bicycle crank that is simple in operation and will provide a repeatable amount of deflection given a defined amount of pedal force. Another object of this invention is to provide an elastic member that is adjustable. A further object of the invention is to allow ease of assembly of the elastic member. Yet another object is to have the spring assembly replaceable with springs of different diameters, external shapes, and cross-sectional areas. An additional object of the invention is to allow for mechanical stops that will prevent damage to the elastic member if placed under a force that would exceed the normal limits of operation. These and other objects will be apparent to those skilled in the art from the following detailed description of a preferred embodiment of the invention.

DETAILED DESCRIPTION OF THE INVENTION

Figure 1:
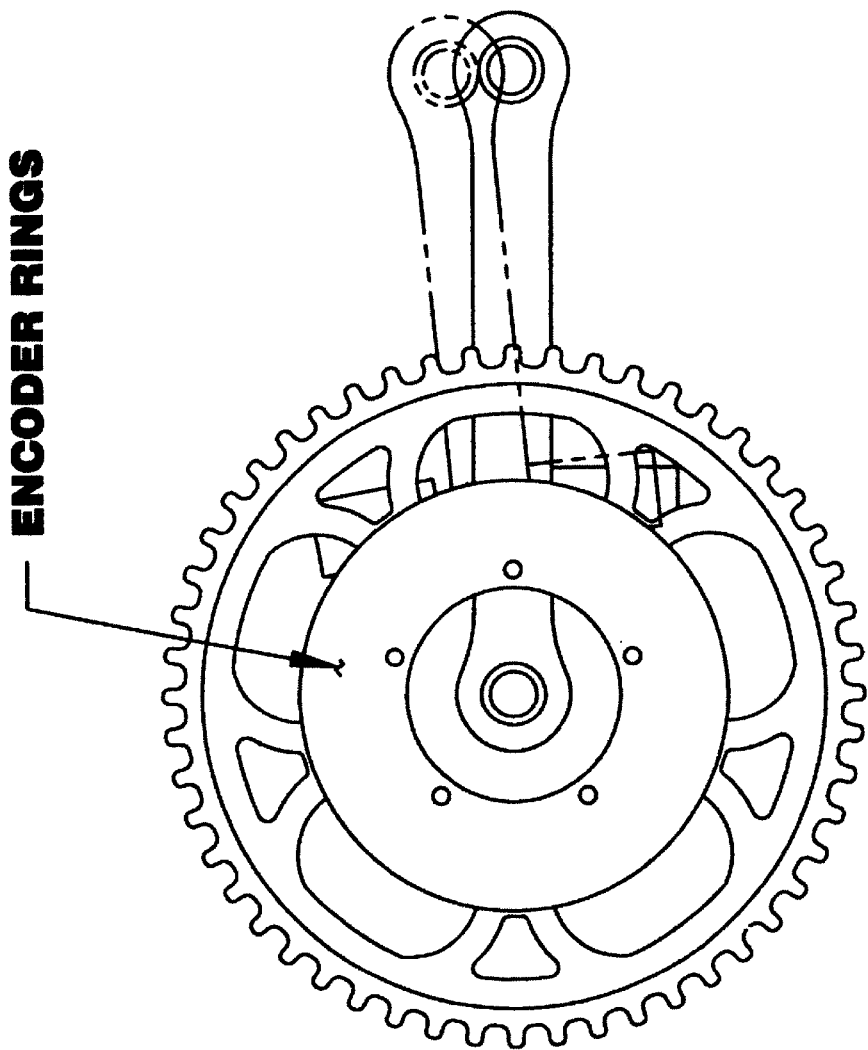
FIG. 1 shows a rear view of the elastic bicycle crank with deflection.
Figure 2:
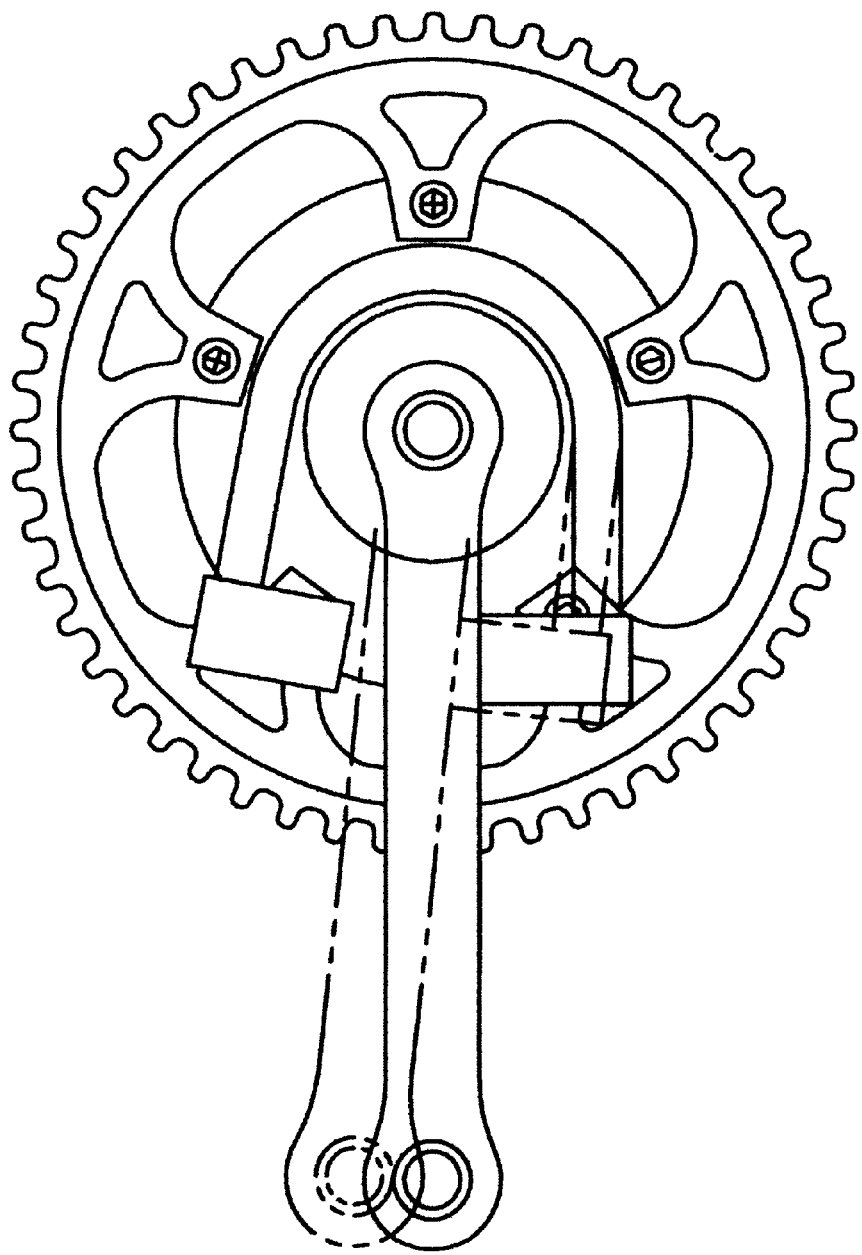
FIG. 2 shows a front view of the elastic bicycle crank with deflection

Referring to FIGS. 1, 2, 3, and 4, it can be seen that the elastic crank apparatus comprises four basic elements: a) a pair of pedals 1 (IR: right and IL: left), each of which is rotatably mounted on one end of respective pedal crank arms 2 (2R: right and 2L: left); b) an axle 3 rotatably supported, in a transverse horizontal position, on bearings 4 in frame 5; c) a chainring assembly 6, comprising at least one chainring 7, but often comprising more than one chainring, each having a different diameter, and each chainring being connected together to form chainring assembly 6; d) An elastic support structure 8 that connects chainring assembly 6 to axle 3. The elastic support structure 8 comprises a U-shaped spring 9 connected on one end to chainring assembly 6 and, on an opposite end, to axle 3 through crank arm 2. Chainring assembly 6 is rotatably mounted to axle 3 through an inset bearing 13.

Each of the pedals 1 is rotatably mounted to the end of its respective crank arm 2 and is generally parallel with axle 3. Crank arms 2 extend perpendicularly from the ends of axle 3. As the bicycle rider applies force to pedals 1, a torque is produced as a result of the moment arm formed by crank arms 2, that cause axle 3 to rotate. Axle 3 is connected through U-shaped spring 9 to chainring assembly 6. Chainring assembly 6 is connected to the rear drive wheel of the bicycle through a chain assembly 11. Chain assembly 11 is in engagement with approximately one-half the circumference of chainring assembly 6. As chainring assembly 6 begins to rotate, energy minus frictional losses is transmitted to the bicycle rear wheel drive assembly (not illustrated) through chain assembly 11. Due to the elasticity of elastic support structure 8, axle 3 begins to deflect angularly in relation to chainring assembly 6. The amount of angular deflection is related to the component of pedal force normal to crank arms 2, and, preferably, is linearly proportional to this normal component. The amount of power transmitted through the chain assembly 11 to the rear wheel drive assembly is proportional to the product of the normal component of pedal force times the rotational speed of chainring assembly 6.

Elastic support structure 8 is comprised of U-shaped spring 9, and end blocks 12a and 12b. Each end block 12a and 12b has an opening therein to adjustably hold one end of U-shaped spring 9. A first end block 12a is attached to chain ring assembly 6 by common fastening means. A second end block 12b is attached to a crank arm 2 attached by common fastening means. U-shaped spring 9 has a first end inserted in the opening of first block 12a and is in adjustable engagement therewith. A common fastening means holds the first end of U-shaped spring 9 to first block 12a. Second block 12b is fastened to crank arm 2 and adjustably engages with the second end of U-shaped spring 9. As the rider presses down on left pedal 1L, the force imparted on left crank arm 2L is transmitted as torque through axle 3, to right crank arm 2R and through end block 12b to U-shaped spring 9, to chainring assembly 6. Similarly, as the rider presses down on right pedal 1R, force is imparted from right crank arm 2R through end block 12b to U-shaped spring 9, to chainring assembly 6. As the rear drive assembly is engaged through chain assembly 11, U-shaped spring 9 is deflected by the amount of force delivered through it.

U-shaped spring 9 is of a predetermined length and elasticity and, given its placement within first block 12a and second block 12b, may be adjusted to different degrees of elasticity. In general, the elasticity of spring 9 may be decreased (that is, made stiffer and more resistant) by positioning it such that its semicircular portion is closer to blocks 12A and 12B, thus shortening its effective moment arm. The range of adjustment may be changed by supplying a spring of different material, or of different cross section: tubular, for instance. Preferably the elasticity adjustment range would be at least 2 or 3 times the minimum setting. Whether spring 9 is adjusted for high or low elasticity, it is convenient to limit its deflection by fitting a mechanical stop (not illustrated) in a customary manner, thus preventing a particularly strong rider from overstressing the spring.

Figure 3:
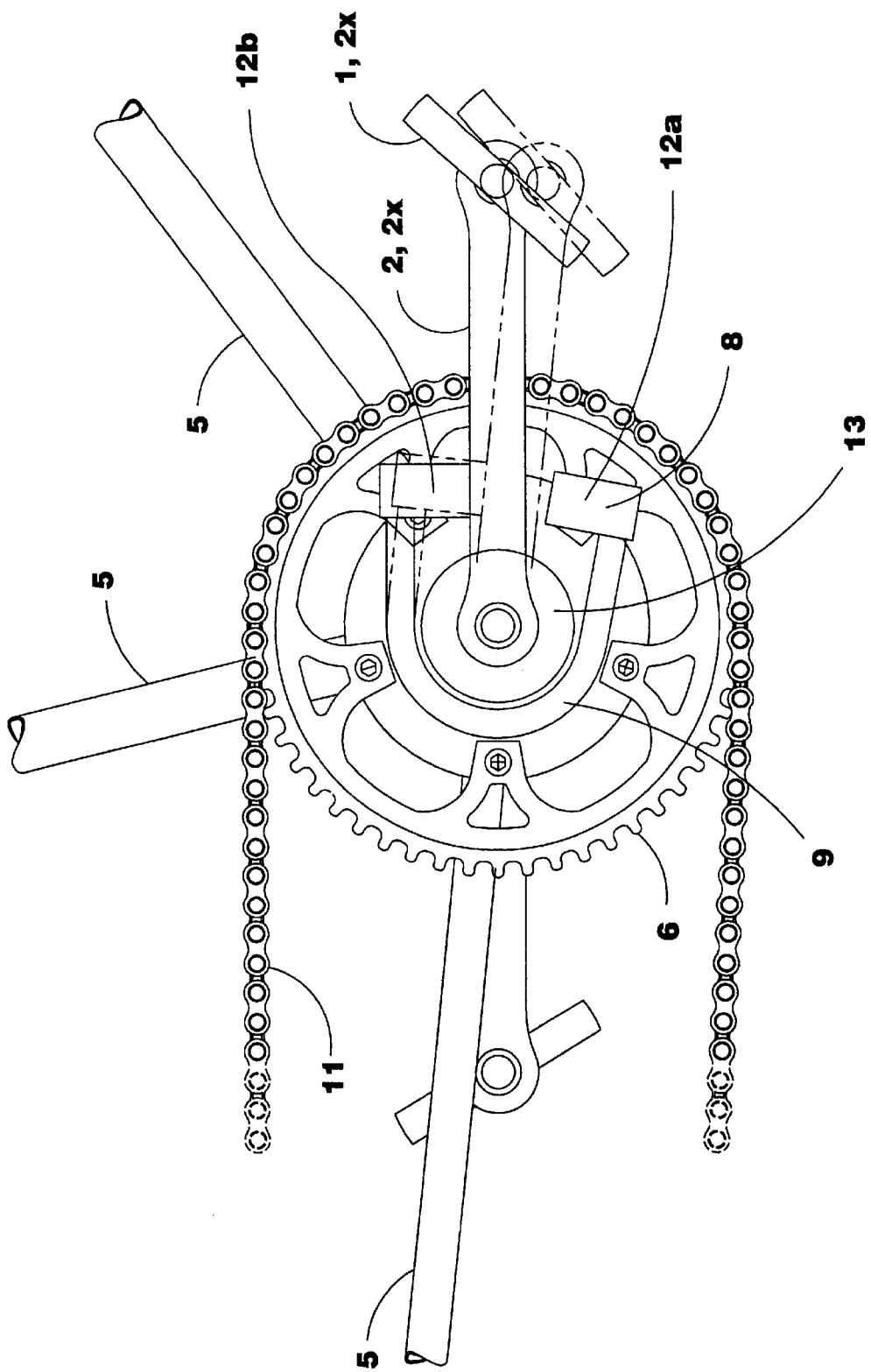
FIG. 3 shows the elastic bicycle crank attached to a bicycle frame.
Figure 4:
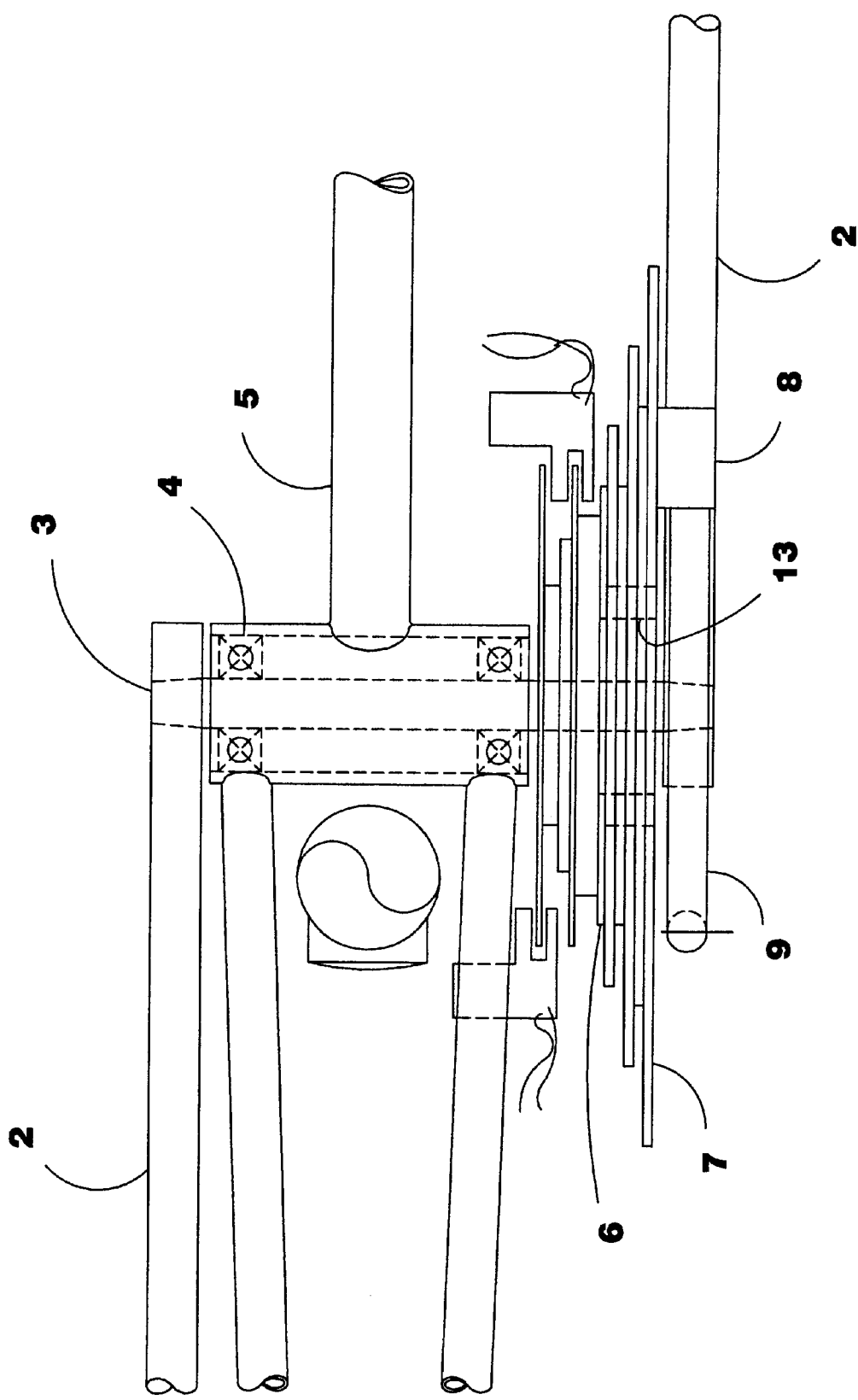
FIG. 4 shows a top view of the bicycle elastic crank attached to the bicycle frame.

As shown in FIG. 3, when a rider applies force to pedal 1, attached crank arm 2 rotates around axle 3 (FIG. 4), as shown by the dotted lines. End block 12b, attached to crank arm 2 and to an end of spring 9, thus deflects spring 9 in the direction that moves its ends towards each other. Hence, there is relative angular movement between axle 3 and chainring assembly 6: the axle rotates clockwise with respect to the chainring assembly. This relative rotation can be conveniently utilized as a measure of the elasticity of spring 9, by defining the elasticity in terms either of degrees per pound of pedal force, radians per kilogram, or any other such units. By measuring this relative rotation with appropriate instrumentation, and by knowing the elasticity, the force on the pedals (or the torque on axle 3, if desired) may be inferred. It will be clear to practitioners of this art that having constant, but adjustable, elasticity will allow for accurate calibration of such instrumentation.

U-shaped spring 9, first block 12a and second block 12b are externally mounted to the crank assembly 3 allowing for ease of adjustablity and servicing.

What is claimed is:

1. A portion of a bicycle propulsion assembly comprising:
   a) a pedal crank assembly having two pedal cranks attached to either end of an axle;
   b) a chainring assembly, comprising at least one chainring, rotatably supported on the axle, and free to rotate about an axis in common with the axle; and
   c) a spring mechanically coupling the chainring assembly and at least one pedal crank, the spring being supported in blocks adjustably clamped to different locations on the spring, whereby varying the camping locations varies the effective length of the spring and, hence, its coefficient of elasticity.

2. A bicycle propulsion assembly, as recited in claim 1, in which the topology of the spring is essential planar.

3. A bicycle propulsion assembly, as recited in claim 2, in which the spring is formed in a U shape consisting of two straight legs connected through a semi-circular segment, and the damping locations are situated along the straight legs.

4. A bicycle propulsion assembly, as recited in claim 3, in which the spring has a circular cross-section.

5. In the section of a bicycle propulsion system comprising a crank assembly which includes pedals and crank arms secured to opposite ends of an axle, and a chainring assembly, a method for achieving a variable angular deflection between the crank assembly and the chainring assembly, wherein the angular deflection has a desired functional relationship to forces applied to the pedals, the method comprising:
   a) rotatably supporting the chainring assembly on the axle;
   b) coupling the chainring assembly to the crank assembly with a spring supported in adjustable damps; and
   c) selecting the location of the spring in the clamps to achieve the desired functional relationship.

6. A method for achieving a variable angular deflection, as in claim 5, in which the spring is formed in a U shape consisting of two straight legs connected through a semi-circular segment, and the clamping locations are situated along the straight legs.

* * * * *